United States Patent [19]

Kidoh et al.

[11] Patent Number: 4,546,149
[45] Date of Patent: Oct. 8, 1985

[54] VINYLIDENE FLUORIDE RESIN COMPOSITION CONTAINING GLYCIDYL (METH)ACRYLATE POLYMER

[75] Inventors: Kunizoh Kidoh; Mitsuru Ohta, both of Fukushima, Japan

[73] Assignee: Kureha Kagaku Kogyo Kabushiki Kaisha, Tokyo, Japan

[21] Appl. No.: 605,707

[22] Filed: Apr. 30, 1984

Related U.S. Application Data

[63] Continuation of Ser. No. 377,399, May 12, 1982, abandoned.

[30] Foreign Application Priority Data

May 18, 1981 [JP] Japan .................................. 56-73415

[51] Int. Cl.[4] ............................................. C08L 27/16
[52] U.S. Cl. ................................... 525/199; 525/913; 524/517; 524/520
[58] Field of Search ......................................... 525/199

[56] References Cited

U.S. PATENT DOCUMENTS 3,253,060  5/1966  Koblitz et al. ........................ 525/199
3,755,496  8/1973  Koizumi et al. ..................... 525/199

Primary Examiner—Carman J. Seccuro
Attorney, Agent, or Firm—Woodcock, Washburn, Kurtz, Mackiewicz & Norris

[57] ABSTRACT

A vinylidene fluoride resin composition which comprises 100 parts by weight of vinylidene fluoride resin and 0.1 to 10 parts by weight of glycidyl (meth)acrylate resin, said glycidyl (meth)acrylate resin being a polymer composed of at least one of glycidyl acrylate and glycidyl methacrylate, or a copolymer composed of a monomer selected from the group consisting of methyl acrylate, methyl methacrylate, ethyl acrylate and ethyl methacrylate and at least one of glycidyl acrylate and glycidyl methacrylate.

The resin composition has improved thermal stability and electrical properties, and is immune to deleterious discoloration.

16 Claims, No Drawings ered to be one cause, in view of the fact that discolored
VINYLIDENE FLUORIDE RESIN COMPOSITION CONTAINING GLYCIDYL (METH)ACRYLATE POLYMER This is a continuation of application Ser. No. 377,399, filed May 12, 1982, now abandoned.

BACKGROUND OF THE INVENTION

1. Field of the Invention

The present invention relates to a vinylidene fluoride resin composition and, more particularly, to a vinylidene fluoride resion composition having improved thermal stability and electrical properties. 2. Brief Description of the Prior Art Vinylidene fluoride resin is generally superior in thermal stability, but it is subject to discoloration to dark brown when extruded under severe conditions at temperatures higher than 200° C., particularly higher than 250° C. This discoloration not only impairs the appearance of the product but also deteriorates the quality of the product due to fluoride ions in defluorination. Where vinylidene fluoride is used as a capacitor film, this discoloration decreases the insulation resistance and life of the capacitor. The cause of such discoloration is not known completely, but the formation of conjugated double bonds resulting from defluorination is considered to be one cause, in view of the fact that discolored resin contains more fluorine ions than intact resin and that carbonyl groups and double bonds are detected in discolored resin by the infrared analysis.

It has been considered that an agent that capures liberated hydrochloric acid would be useful to improve the thermal stability of vinylidene fluoride resin as in vinyl chloride resin. In actual, however, none has been found effective for vinylidene fluoride resin among the existing stabilizers including organotin stabilizers for vinyl chloride resin, metal soaps represented by lead stearate, amine stabilizers represented by aminocrotonic acid ester, and epoxy compounds represented by epoxidized vegetable oil. They sometimes exhibit even adverse effects.

In connection with the improvement of thermal stability of vinylidene fluoride resin, there is disclosed in Japanese Patent Laid-Open No. 149243/1978 the incorporation of phosphinic acid (salt). It improves the thermal stability at the time of processing, but the addition of an inorganic salt deteriorates considerably the electrical properties of molded articles. There is disclosed the blending of an epoxy resin with vinylidene fluoride resin in Japanese Patent Laid-Open No. 100447/1979, U.S. Pat. No. 3976617, and Soviet Pat. Nos. 492530 and 492531. These disclosures relate to improving the adhesion of vinylidene fluoride resin to a metal substrate and to preventing the vinylidene fluoride resin coating from blistering in boiling water, by the aid of epoxy resin blended therein.

In the expectation that epoxy resin would capture hydrofluoric acid, the present inventors studied the thermal stability of vinylidene fluoride resin incorporated with epoxy resin. Contrary to the expectation, the improvement of thermal stability was not achieved and it was found that epoxy resin is poor in compatibility and deleterious to transparency.

OBJECTS AND SUMMARY OF THE INVENTION

It is an object of this invention to provide a vinylidene fluoride resin composition which is improved in thermal stability without adverse effects on electrical properties.

It is another object of this invention to provide a vinylidene fluoride resin composition which is good in compatibility and transparency and is free of discoloration.

The gist of the invention resides in incorporating a resin composed of at least one of glycidyl acrylate and glycidyl methacrylate into vinylidene fluoride resin. The resin composed of at least one of glycidyl methacrylate and glycidyl acrylate is referred to as "glycidyl(meth)acrylate resin" hereinafter.

DETAILED DESCRIPTION OF THE PREFERRED EMBODIMENTS

The glycidyl(meth)acrylate resin referred to in this invention is a polymer composed of at least one of glycidyl acrylate and glycidyl methacrylate, or a copolymer composed of at least one of glycidyl acrylate and glycidyl methacrylate and a monomer selected from the group consisting of methyl acrylate, methyl methacrylate, ethyl acrylate and ethyl methacrylate. The above polymer should preferably be composed of only the above-mentioned monomers. The polymer composed of at least one of glycidyl acrylate and glycidyl methacrylate is preferred because it is possible to achieve the object of this invention with it in a small quantity. The copolymer composed of at least one of glycidyl acrylate and glycidyl methacrylate and a monomer selected from methyl methacrylate and ethyl methacrylate is also preferred for application areas where high thermal stability is required, because it can be incorporated into vinylidene fluoride resin in large quantities due to its good compatibility. The glycidyl(meth)acrylate resin may contain a small quantity of copolymerizable monomers other than the above-mentioned monomers.

The glycidyl(meth)acrylate resin is incorporated in an amount of 0.1 to 10 parts by weight, preferably 0.5 to 5 parts by weight, for 100 parts by weight of the vinyliden fluoride resin. If the amount incorporated is less than the lower limit, thermal stability is not sufficient, and if it is larger than the upper limit, the vinyliden fluoride resin loses its characteristic properties such as solvent resistance. For improved thermal stability, at least one of glycidyl acrylate and glycidyl methacrylate, which is the constituent monomer of the glycidyl(meth)acrylate resin, should preferably be present in an amount larger than 0.1 part by weight, more preferably larger than 0.2 part by weight, for 100 parts by weight of the vinylidene fluoride resin.

At least one of glycidyl acrylate and glycidyl methacrylate, which is the constituent monomer, should be peferably used in an amount larger than 1 wt.%, more preferably larger than 5 wt.%, most preferably larger than 10 wt.%, in the glycidyl(meth)acrylate resin. If the amount used is less than the lower limit, the improvement of thermal stability is not sufficient because the concentration of glycidyl acrylate and/or goycidyl methacrylate is low.

The vinylidene fluoride resin as used in this specification denotes vinylidene fluoride homopolymer or copolymers composed of at least 50 mol% of vinylidene fluoride and at least one of copolymerizable monomers such as vinyl fluoride, chlorotrifluoroethylene, tetrafluoroethylene and perfluoroacrylic acid ester.

The essential polymer in the vinylidene fluoride resin composition according to the present invention may be produced by suspension polymerization, emulsion polymerization or solution polymerization; but it should have a melting viscosity of $1 \times 10^3$ to $5 \times 10^4$ poise at 220° C. when measured with a flow tester which extrudes the melt through a nozzle of 1 mm in diameter and 10 mm long under a load of 150 kg/cm$^2$.

The vinylidene fluoride resin composition according to the present invention may contain, in addition to the above-mentioned two polymers, a small quantity of additives such as polycarbonate, polyethylene terephthalate, and other polymers; TiO$_2$ ceramics ferroelectric material, carbon black, talc, calcium carbonate, mica, and other inorganic substances; pentaerythritol (as secondary stabilizer); and pigments.

The vinylidene fluoride resin composition according to the present invention may be obtained by blending the components with a known blender such as ribbon blender or Henschel mixer, and may be molded by the known molding process.

Examples of the present invention will be described hereinafter.

EXAMPLE 1

Vinylidene fluoride resin (100 g) and glycidyl(meth)acrylate resin in an amount specified in Table 1 were blended and mixed by a roll mill at 170° C. for 5 minutes to give a sheet.

From this sheet was cut a piece of sheet weighing 4.5 g. The cut sheet was pressed in a stainless steel frame measuring 50×50×1 mm placed between two ferrotype plates, at 270° C. for 2 minutes for preheating and then at 270° C. for 30 minutes under a pressure of 100 kg/cm$^2$. Thermal stability was evaluated by ranking the press-molded specimens according to discoloration as follows:

A . . . Almost no discoloration
B . . . Slightly light brown
C . . . Light brown
D . . . Brown
E . . . Dark brown The results are shown in table 1.

TABLE 1

| | | Glycidyl (Meth)acrylate Resin | | |
|---|---|---|---|---|
| No. | Vinylidene Fluoride Resine | Component Resin | Amount per Vinylidene Fluoride Resin | Thermal Stability |
| 1 | PVDF *a | PGMA *e | 8.0 PHR | A |
| 2 | PVDF *a | PGMA *e | 5.0 | A |
| 3 | PVDF *a | PGMA *e | 1.0 | A |
| 4 | PVDF *a | PGMA *e | 0.5 | A |
| 5 | PVDF *a | PGMA *e | 0.2 | B |
| 6 | PVDF *a | P(GMA/MMA = 75/25) *f | 1.0 | A |
| 7 | PVDF *a | P(GMA/MMA = 50/50) *g | 1.0 | A-B |
| 8 | PVDF *a | P(GMA/MMA = 25/75) *h | 1.0 | B |
| 9 | PVDF *a | P(GMA/EMA) *i | 1.0 | A |
| 10 | PVDF *a | P(GMA/MA) *j | 1.0 | A |
| 11 | PVDF *a | P(GMA/EA) *k | 1.0 | A |
| 12 | PVDF *a | P(GMA/MMA = 50/50) | 2.0 | A |
| 13 | PVDF *a | P(GMA/MMA = 50/50) | 0.5 | B |
| 14 | PVDF *a | PGA *l | 1.0 | A |
| 15 | PVDF *a | P(GA/MMA) *m | 2.0 | A |
| 16 | PVDF *a | P(GA/MMA) *m | 1.0 | A-B |
| 17 | PVDF *a | — | 0 | C |
| 18 | P(VDF/VF) *b | P(GMA/MMA = 50/50) | 1.0 | B-C |
| 19 | P(VDF/VF) *b | P(GMA/MMA = 50/50) | 0.5 | B-C |
| 20 | P(VDF/VF) *b | — | 0 | E |
| 21 | P(VDF/TFE/VF) *c | P(GMA/MMA = 50/50) | 1.0 | B |
| 22 | P(VDF/TFE/VF) *c | P(GMA/MMA = 50/50) | 0.5 | B-C |
| 23 | P(VDF/TFE/VF) *c | — | 0 | D |
| 24 | P(VDF/ClTFE) *d | P(GMA/MMA = 50/50) | 1.0 | A-B |
| 25 | P(VDF/ClTFE) *d | P(GMA/MMA = 50/50) | 0.5 | B |

TABLE 1-continued

| | | Glycidyl (Meth)acrylate Resin | | |
|---|---|---|---|---|
| No. | Vinylidene Fluoride Resine | Component Resin | Amount per Vinylidene Fluoride Resin | Thermal Stability |
| 26 | P(VDF/ClTFE) *d | — | 0 | C-D |

Note to Table 1.

*a: PVDF: Vinylidene fluoride homopolymer having a viscosity (abbreviated as inh hereinafter) of 1.1 dl/g measured for the dimethylformamide solution at a concentration of 0.4 g/dl at 30° C.

*b: P(VDF/VF): Copolymer composed of 95 wt. % of vinylidene fluoride and 5 wt. % of vinyl fluoride, having an inh of 0.8 dl/g.

*C: P(VDF/TFE/VF): Copolymer composed of 85 wt. % of vinylidene fluoride, 10 wt. % of ethylene tetrafluoride, and 5 wt. % of vinyl fluoride, having an inh of 0.7 dl/g.

*D: P(VDF/ClTFE): Copolymer composed of 90 wt. % of vinylidene fluoride and 5 wt. % of ethylene trifluorocaloride, having an inh of 0.9 dl/g.

*e: PGMA: Glycidyl. methacrylate homopolymer having a melting viscosity of $1.2 \times 10^4$ poise at 220° C. when measured with a flow tester which extrudes the melt through a nozzle 1 mm in diameter and 10 mm long under a load of 150 kg/cm$^2$.

*f: P(GMA/MMA = 75/25): Copolymer composed of 75 wt. % of glycidyl methacrylate and 25 wt. % of methyl methacrylate, having a melting viscosity of $9.2 \times 10^3$ poise measured under the same conditions as above.

*g: P(GMA/MMA = 50/50): Copolymer composed of 50 wt. % of glycidyl methacrylate and 50 wt. % of methyl methacrylate, having a melting viscosity of $8.7 \times 10^3$ poise measured under the same conditions as above.

*h: P(GMA/MMA = 25/75): Copolymer composed of 25 wt. % of glycidyl methacrylate and 75 wt. % of methyl methacrylate, having a melting viscosity of $8.1 \times 10^3$ poise measured under the same conditions as above.

*i: P(GMA/EMA): Copolymer composed of 75 wt. % of glycidyl methacrylate and 25 wt. % of ethyl methacrylate, having a melting viscosity of $8.9 \times 10^3$ poise measured under the same conditions as above.

*j: P(GMA/MA): Copolymer composed of 75 wt. % of glycidyl methacrylate and 25 wt. % of ethyl methacrylate, having a melting viscosity of $7.7 \times 10^3$ poise measured under the same conditions as above.

*k: P(GMA/EA): Copolymer composed of 75 wt. % of glycidyl methacrylate and 25 wt. % of ethyl acrylate, having a melting viscosity of $7.2 \times 10^3$ poise measured under the same conditions as above.

l*: PGA: Homopolymer of glycidyl acrylate having a melting viscosity of $9.7 \times 10^3$ poise measured under the same conditions as above.

*m: P(GA/MMA): Copolymer composed of 50 wt. % of glycidyl methacrylate and 50 wt. % of methyl methacrylate, having a melting viscosity of $8.1 \times 10^3$ poise measured under the same conditions as above.

EXAMPLE 2

One hundred parts by weight of PVDF was mixed with PGMA, P(GMA/MMA=75/25), or P(GMA/MMA=50/50) in an amount as shown in Table 2. The mixture was melted by an extruder at 220° C. to yield pellets. The pellets were fed to a T-die extruder and formed into an unoriented film having width of 350 mm and thickness of 90 μm. The film was then stretched about three times at 155° C. in the longitudinal direction to give a uniaxially stretched film, about 30 μm thick.

A uniaxially stretched film, about 30 μm thick, was also prepared from PVDF homopolymer containing no glycidyl(meth)acrylate resin.

On both sides of these sample films were formed aluminum electrodes, about 7 cm$^2$ in area, by vacuum deposition. A voltage of 2 KV DC was applied across the electrodes in an oven at 70° C. to determine the deterioration of insulation resistance.

Volume resistivity was calculated from the insulation resistance (1 minute value) at 1000 V DC and 23° C. measured by an insulation resistance meter, Model SM-5E, a product of Toa Dempa Co., Ltd. The results are shown in Table 2.

As will be noted from the above examples, the vinylidene fluoride resins deteriorate in thermal stability and insulation performance when subjected to a high volage at high temperatures, whereas the resin composition of this invention deteriorates very little under the same conditions. Thus, the resin composition of this invention is useful as a raw material for electrical insulation films and dielectric films for capacitors.

TABLE 2

| | No. | Glycidyl (Meth)acrylate Resin | | Volume Resistivity in Voltage Application Test at High Temperature of 70° C. and 2 KV DC $(\Omega \cdot cm) \times 10^{-15}$ | | | |
|---|---|---|---|---|---|---|---|
| | | Component Resin | Added Amount (by weight) | Initial | After 60 h | After 125 h | After 250 h |
| Example 2 | 1 | P(GMA/MMA = 50/50) | 2 parts | 1.8 | 1.6 | 1.5 | 1.4 |
| | 2 | P(GMA/MMA = 50/50) | 5 parts | 2.6 | 2.5 | 2.5 | 2.3 |
| | 3 | P(GMA/MMA = 75/25) | 2 parts | 2.6 | 2.5 | 2.4 | 2.4 |
| | 4 | PGMA | 1 part | 2.3 | 2.3 | 2.1 | 2.1 |
| Comparative Example | | — | 0 | 1.6 | 1.1 | 0.7 | 0.6 |

What is claimed is:

1. A composition having improved resistance to decomposition and discoloration consisting essentially of 100 parts by weight of vinylidene fluoride polymer comprising at least 50 mole percent vinylidene fluoride, and 0.1 to 10 parts by weight of thermal stabilizer consisting of glycidyl acrylic polymer, said polymer being formed from monomers including at least one selected from the group consisting of glycidyl acrylate and glycidyl methacrylate.

2. The composition of claim 1 wherein said glycidyl acrylic polymer is formed from monomers including at lest 0.1 part by weight of glycidyl acrylate and/or glycidyl methacrylate per 100 parts by weight of vinylidene fluoride resin.

3. The composition of claim 1 wherein said glycidyl acrylic polymer is formed from monomers including at least 0.2 parts by weight of glycidyl acrylate and/or glycidyl methacrylate per 100 parts by weight of vinylidene fluoride resin.

4. The composition of claim 1 wherein said composition comprises 100 parts by weight of vinylidene fluoride resin and 0.5 to 5 parts by weight of glycidyl acrylic polymer, said polymer being formed from monomers including at least one selected from the group consisting of glycidyl acrylate and glycidyl methacrylate.

5. The composition of claims 1, 2, 3, or 4 wherein glycidyl acrylate and/or glycidyl methacrylate is present in said monomers in an amount of at least 5% by weight.

6. The composition of claim 1, 2, 3 or 4 wherein glycidyl acrylate and/or glycidyl methacrylate is present in said monomers in an amount of at least 10% by weight.

7. The composition of claim 1, 2, 3 or 4 wherein glycidyl acrylate and/or glycidyl methacrylate is present in said monomers in an amount of at least 25% by weight.

8. The composition of claim 1, 2, 3 or 4 wherein said glycidyl acrylic polymer is formed essentially from at least one selected from the group consisting of glycidyl acrylate and glycidyl methacrylate.

9. A composition having improved resistance to decomposition and discoloration consisting essentially of 100 parts by weight of vinylidene fluoride polymer comprising at lest 50 mole percent vinylidene fluoride, and 0.1 to 10 parts by weight of thermal stabilizer consisting of glycidyl acrylic polymer, said polymer being formed from monomers including at least one selected from the group consisting of glycidyl acrylate and glycidyl methacrylate and at least one monomer selected from the group consisting of methyl acrylate, methyl methacrylate, ethyl acrylate and ethyl methacrylate.

10. The composition of claim 9 wherein said glycidyl acrylic polymer is formed from monomers including at least 0.1 part by weight of glycidyl acrylate and/or glycidyl methacrylate per 100 parts by weight of vinylidene fluoride resin.

11. The composition of claim 9 wherein said glycidyl acrylic polymer is formed from monomers including at least 0.2 parts by weight of glycidyl acrylate and/or glycidyl methacrylate per 100 parts by weight of vinylidene fluoride resin.

12. The composition of claim 9 wherein said composition comprises 100 parts by weight of vinylidene fluoride resin and 0.5 to 5 parts by weight of glycidyl acrylic polymer, said polymer being formed from monomers including at least one selected from the group consisting of glycidyl acrylate and glycidyl methacrylate and at least one monomer selected from the group consisting of methyl acrylate, methyl methacrylate, ethyl acrylate and ethyl methacrylate.

13. The composition of claim 9, 10, 11 or 12 wherein glycidyl acrylate and/or glycidyl methacrylate is present in said monomers in an amount of at least 5% by weight.

14. The composition of claim 9, 10, 11 or 12 wherein glycidyl acrylate and/or glycidyl methacrylate is present in said monomers in an amount of at least 10% by weight.

15. The composition of claim 9, 10, 11 or 12 wherein glycidyl acrylate and/or glycidyl methacrylate is present in said monomers in an amount of at least 25% by weight.

16. The composition of claim 8, 9, 10 or 11 wherein said glycidyl acrylic polymer is formed essentially from at least one selected from the group consisting of glycidyl acrylate and glycidyl methacrylate and at least one monomer selected from the group consisting of methyl acrylate, methyl methacrylate, ethyl acrylate and ethyl methacrylate.

* * * * *